United States Patent [19]

Wienand et al.

[11] 4,455,174

[45] Jun. 19, 1984

[54] YELLOW PIGMENT CONTAINING BISMUTH VANADATE AND HAVING THE COMPOSITION BiVO$_4$.xBi$_2$MoO$_6$.yBi$_2$WO$_6$

[75] Inventors: Henning Wienand, Hockenheim; Werner Ostertag, Gruenstadt; Knut Bittler, Speyer, all of Fed. Rep. of Germany

[73] Assignee: BASF Aktiengesellschaft, Fed. Rep. of Germany

[21] Appl. No.: 411,864

[22] Filed: Aug. 26, 1982

[30] Foreign Application Priority Data

Sep. 5, 1981 [DE] Fed. Rep. of Germany ....... 3135281

[51] Int. Cl.$^3$ .............................................. C09C 1/00
[52] U.S. Cl. .................................................. 156/288 B
[58] Field of Search .................... 156/288 B, 306, 309; 423/593

[56] References Cited

U.S. PATENT DOCUMENTS

| | | | |
|---|---|---|---|
| 4,026,722 | 5/1977 | Hess | 106/288 B |
| 4,115,142 | 9/1978 | Hess | 106/288 B |
| 4,230,500 | 10/1980 | Balducci et al. | 106/288 B |
| 4,272,296 | 6/1981 | Balducci et al. | 106/288 B |
| 4,316,746 | 2/1982 | Rustioni et al. | 106/288 B |

FOREIGN PATENT DOCUMENTS

| | | |
|---|---|---|
| 2933778 | 3/1980 | Fed. Rep. of Germany . |
| 3004083 | 8/1980 | Fed. Rep. of Germany . |
| 2069990 | 9/1981 | United Kingdom . |

*Primary Examiner*—Mark Bell
*Attorney, Agent, or Firm*—Keil & Weinkauf

[57] ABSTRACT

Yellow pigments containing bismuth vanadate and having the composition

BiVO$_4$.xBi$_2$MoO$_6$.yBi$_2$WO$_6$ where x is from 0.6 to 2.25 and y is from 0 to 0.1, are prepared by a process in which a solution containing a bismuth(III) salt, a vanadate and a molybdate is acidified until the pH is <0, the pH of the acidic solution is then brought to 0.1–3.5, at from 20° to 95° C., by means of an alkaline solution which may or may not contain a dissolved tungsten(VI) compound, the precipitated product and the reaction solution are left at from 50° to 100° C. for from 30 to 120 minutes and then separated from one another, and the product is washed, dried if required and heated at from 300° to 800° C.

1 Claim, 3 Drawing Figures

FIG.1

YELLOW PIGMENT CONTAINING BISMUTH VANADATE AND HAVING THE COMPOSITION $BiVO_4 \cdot xBi_2MoO_6 \cdot yBi_2WO_6$ The present invention relates to novel inorganic yellow pigments based on bismuth vanadate and bismuth molybdate, with or without bismuth tungstate, and processes for their preparation.

The most commonly used inorganic yellow pigments are the lead chromate, cadmium sulfide, nickel titanate yellow and iron yellow pigments. Among these conventional yellow pigments, the chromate and cadmium pigments possess particularly good color strength, color purity and hiding power. Although nickel titanate yellow has good hiding power, it is of relatively low color strength compared with the chromate and cadmium pigments. The iron yellow pigments are particularly economical to use, but lack color purity and the necessary thermal stability. It is known that iron yellow pigments, which initially have a brownish appearance, begin to change at as low as 180° to 200° C., and are converted into iron red, water being released.

Unfortunately, the chromate and cadmium pigments, although they possess excellent coloristic properties, are toxic. Owing to the possible danger to health as a result of using these pigments, there is a need for pigments to replace the lead chromate and cadmium sulfide pigments.

These substitute pigments must possess good color strength, brilliance and hiding power, and should fulfil a number of stability criteria, of which the most important are lightfastness and thermal stability.

In the search for alternative inorganic yellow pigments, interest has increasingly been focussed in the past on non-toxic, monoclinic bismuth vanadate (U.S. Pat. No. 4,115,142). Although bismuth vanadate pigments have color properties which are very similar to those of lead chromate and cadmium sulfide, they have the disadvantage that, compared with lead chromate pigments, they offer only poor protection, if any at all, against corrosion.

U.S. Pat. No. 4,026,722 describes the preparation of a bismuth vanadate yellow having a monoclinic crystal structure and the composition $BiVO_4 \cdot xAl_2O_3 \cdot ySiO_2$, where x is 0.25–2.0 and y is 0.1–3.5, and x+y is $\geq 1$. In the preparation of the pigment, $Bi_2O_3$, $NH_4VO_3$ or $V_2O_5$, $Al_2O_3$ and/or $SiO_2$ are mixed, as dry materials, and calcined at from 800° to 1,100° C. The product is then wet-milled. Compared with cadmium sulfide, the resulting bright yellow pigment has low color purity and only poor hiding power.

Furthermore, German Laid-Open Application DOS No. 2,933,778 describes yellowish green to yellowish orange bismuth vanadate pigments which, in addition to $BiVO_4$, also contain $BiPO_4$ and $AlPO_4$. These pigments are obtained by a dry process in which a mixture of $BiPO_4$, $Al_2O_3$ and $V_2O_5$ is calcined at from 700° to 1,100° C. German Laid-Open Application DOS No. 2,940,105 also describes greenish yellow pigments which are based on bismuth vanadate and are obtained by calcining $BiPO_4$, $V_2O_5$ and an oxide of the formula MeO where Me is calcium, barium, magnesium or zinc. The hues of these pigments depend on their composition and the calcination temperature. Compared with cadmium sulfide, these yellow pigments, also, possess low brilliance and poor hiding power, and have excessively orange hues in many cases.

German Laid-Open Application DOS No. 3,004,083 describes another yellow pigment which is based on bismuth vanadate and which, in addition to $BiVO_4$, contains from 10 to 90% by weight of orthorhombic barium sulfate as a diluent. Pigments of this type are prepared from bismuth nitrate, barium nitrate and an alkali metal vanadate in a solution containing sulfuric acid, using a wet-chemical procedure. The precipitated product is filtered off, washed, and calcined at from 400° to 700° C. Compared with cadmium sulfide, these bismuth vanadate pigments containing barium sulfate also possess poor hiding power.

Finally, British Pat. No. 2,069,990 describes inorganic yellow pigments of the formula $Bi_{1-x/3} \cdot M_x \cdot V_{-x}O_4$ where M is molybdenum or tungsten. Where M is molybdenum, these pigments consist of a tetragonal crystalline scheelite-type phase, and where M is tungsten, an orthorhombic crystalline phase of $Bi_2WO_6$ is present in addition to the said tetragonal phase. x may be from 0.075 to 0.317 when M is molybdenum, and from 0.059 to 0.265 when M is tungsten.

This gives a pigment composition (in percent by weight) in the case of molybdenum of

|  | x = 0.075 | x = 0.317 |
|---|---|---|
| $Bi_2O_3$ | 70.5% | 65.9% |
| $MoO_3$ | 3.4% | 14.4% |
| $V_2O_5$ | 26.1% | 19.7% | and in the case of tungsten of

|  | x = 0.059 | x = 0.265 |
|---|---|---|
| $Bi_2O_3$ | 69.7% | 62.4% |
| $WO_3$ | 4.2% | 18.0% |
| $V_2O_5$ | 26.1% | 19.6% |

If x is below the stated minimum value, crystallization of the tetragonal phase is said to be poor, and when x is above the stated maximum value, in general products having a lower color strength are said to be obtained. In each case, however, these pigments are substantially inferior to the above monoclinic pure bismuth vanadate in respect of color values and hiding power, although they offer better protection against corrosion than the said bismuth vanadate.

It may be stated in summary that no yellow pigments based on bismuth vanadate have hitherto been disclosed, which possess a hue, brilliance and hiding power equal to those of cadmium sulfide, as well as offering corrosion protection equal to that obtainable with the conventional, but toxic, lead chromate pigments.

It is an object of the present invention to provide a yellow pigment which contains bismuth vanadate, possesses color values, hiding power and brilliance very similar to those of cadmium sulfide and offers corrosion protection very similar to that obtainable with lead chromate, and to provide a process for its preparation.

We have found that this object is achieved by a yellow pigment having the composition BiVO$_4$.xBi$_2$MoO$_6$.yBi$_2$WO$_6$ where x is from 0.6 to 2.25 and y is from 0 to 0.1.

Where x is from 0.6 to 2.25, the novel pigments have the following compositions (in percent by weight):

|  | x = 0.6 | x = 2.25 |
|---|---|---|
| Bi$_2$O$_3$ | 74.35% | 75.54% |
| MoO$_3$ | 12.52% | 19.09% |
| V$_2$O$_5$ | 13.19% | 5.36% |

The pigments according to the invention are yellow pigments which possess brilliance, surprisingly high color strength, high color purity and high hiding power. The pigments of the composition BiVO$_4$.xBi$_2$MoO$_6$ where x is from 0.75 to 1.0 have color values which are the most similar to those of cadmium sulfide.

The novel pigment may be prepared, for example, by mixing an aqueous solution of a bismuth(III) salt, eg. bismuth nitrate Bi(NO$_3$)$_3$, with individual neutral or alkaline solutions of an alkali metal or ammonium vanadate and an alkali metal or ammonium molybdate, with or without a solution of an alkali metal or ammonium tungstate, or by mixing the above bismuth salt with a single solution containing the above components. Advantageously, these solution or solutions of the vanadate and molybdate, and where relevant of the tungstate, are run into the stirred bismuth salt solution. During precipitation, the pH in the precipitation vessel is kept at $\leq 3.5$, advantageously at $<2$, particularly advantageously at $\leq 1$, and this may readily be achieved by appropriately acidifying the initially taken bismuth salt solution by adding an acid. Particularly suitable acids are sulfuric acid and nitric acid. The precipitation may be carried out at from 25° to 100° C., advantageously at from 75° to 95° C. The pigment is precipitated in the form of fine gel particles, the size of which is determined by, inter alia, the turbulence present in the precipitation vessel.

It is advantageous, after precipitation is complete but before filtration, washing and drying have been carried out, where necessary to increase the pH to 3.0-3.5, and to leave the suspension for from 30 to 120 minutes, with or without stirring, advantageously at from 50° to 100° C., in order to age the gel. The raising of the pH is advantageously carried out within a period of from 30 to 90 minutes.

After the drying, the pigment is calcined at from 300° to 800° C., preferably 550° to 650° C., for from 0.5 to 4 hours. If the pigment is to be reduced with, for example, PbSO$_4$, BaSO$_4$, CaSO$_4$, SiO$_2$, CaCO$_3$, Al$_2$O$_3$ or CaO, this is advantageously done before the calcination.

It is of course also possible to prepare the bismuth vanadate/molybdate/tungstate pigments by reacting the solids, for example bismuth nitrate, vanadium pentoxide, ammonium molybdate and ammonium tungstate, at elevated temperatures, but the quality of the resulting products is in most cases inferior to that of the products obtained by a wet-chemical method.

In a preferred procedure, a solution containing a bismuth(III) salt, a vanadate and a molybdate is acidified until the pH is $>0$, the pH of the acidic solution is then brought to 0.1-3.5, at from 20° to 95° C., by means of an alkaline solution which may or may not contain a dissolved tungsten(VI) compound, the precipitated product and the reaction solution are left at from 50° to 100° C. for from 30 to 120 minutes and then separated from one another, and the product is washed, dried if required and heated at from 300° to 800° C.

Using this procedure, it is possible to prepare pigments which are particularly finely divided and hence of high color strength. It is very important that the particles obtained at the precipitation stage should have a small size, uniformity of shape and a narrow size distribution, since these particles inevitably grow larger during the subsequent heat treatment, which is necessary to convert the precipitate into pigmentary form.

Surprisingly, yellow pigments containing bismuth vanadate can be obtained in a finely divided form during the precipitation stage, in an industrially simple procedure, if an acidic solution containing bismuth, vanadium and molybdenum in the desired molar ratio is prepared, and then combined with a stirred aqueous solution of an alkali. The precipitate prepared by this procedure is free from agglomerates, and is much more finely divided than that obtainable by the procedure mentioned at the outset, the conditions (concentration of the precipitating agents, temperature, etc.) being otherwise identical. Subsequent filtration, washing and heating of the precipitate gives a very lightfast and weathering-fast pigment of high brilliance and color strength. Analysis shows that the precipitates possess the desired molar composition, and this is certainly facilitated by employing a single solution containing an optimum distribution of the Bi, V, Mo and, where relevant, W ions.

Particularly suitable bismuth(III) salts are bismuth(III) acetate and bismuth(III) nitrate. The vanadium compound used may be, in particular, an alkali metal metavanadate or ammonium vanadate, while particularly suitable molybdenum compounds are alkali metal molybdates, especially the sodium and potassium compounds. Advantageously, highly saturated aqueous solutions of the individual components are prepared separately. In preparing the bismuth salt solution, an acid is added, advantageously the acid containing the anion of the particular bismuth salt. The separately prepared solutions are combined, and, where necessary, the pH is brought to $>0$. To bring about precipitation, the pH of the combined solution is brought to 0.1-3.5 with an alkaline solution, for example, in particular, a caustic alkali solution, or with an alkali metal carbonate or ammonia. The addition is carried out in the course of from 5 to 60 minutes, and during the precipitation process the reaction solution should be at from 20° to 95° C. It is important that after the precipitation is complete, as in the procedure described first, the solution is kept at from 50° to 100° C. for a further 30-120 minutes before the precipitated product is separated off. During the precipitation and the subsequent heating, it is advantageous to agitate the reaction solution, for example by stirring it. However, it is also possible to introduce the acidic solution and the alkaline solution required for the precipitation simultaneously into an initially taken volume of the reaction solution, for example through nozzles, the two solutions swirling in opposite directions, or to introduce a swirling jet of the caustic alkali solution below the surface of the initially taken acidic solution, thereby also thoroughly mixing the reactants with one another.

The precipitate, after it has been separated off from the reaction solution, is kept at from 300° to 800° C., as stated above. It is possible either to heat the dry product or to subject the pigment suspension to a hydrothermal treatment. When heating the dry product, it is advantageous to choose a relatively high temperature of from 500° to 800° C., preferably from 570° to 650° C., whereas a lower temperature of from 300° to 360° C. is adequate in hydrothermal treatment.

The $BiVO_4$-containing yellow pigments of the $BiVO_4.xBi_2MoO_6.yBi_2WO_6$ type are most advantageously prepared by combining an acidic solution containing a Bi compound, a V compound and an Mo compound with a tungstate-containing alkaline solution, stirring the mixture further, and carrying out the heat treatment as described above. Suitable tungsten compounds are those of tungsten(VI).

If the novel pigment is to be reduced with, for example, $BaSO_4$, the preparation of the latter may advantageously be integrated with the above process for the preparation of the pigment, this being achieved by adding the barium ions, for example in the form of barium nitrate, to the acidic solution containing bismuth, vanadium and molybdenum ions, and mixing sodium sulfate with the alkaline solution. The $BaSO_4$ is then precipitated simultaneously with the bismuth vanadate intermediate in an extremely finely divided form, this being advantageous for the coloristic properties of the yellow pigment.

The stability of the pigments according to the invention can be increased by precipitating a sparingly soluble inorganic compound, eg. zirconium silicate, in a conventional manner, to provide a coating on the pigment. Other inorganic coatings, for example those conventionally used for stabilizing lead chromate pigments, eg. alumina, aluminum phosphate or antimony(III) oxide, may also be employed successfully.

The novel pigments possess a very pure yellow hue which is very similar to that of cadmium sulfide or lead chromate, and also offer corrosion protection similar to that obtainable with led chromate.

Independently of their compositions, the novel pigments are thermally and chemically stable, and lightfast.

The novel yellow pigments are used in paints and for coloring plastics.

EXAMPLE 1

$BiVO_4.Bi_2MoO_6$ (molar ratio 1:1)

310 ml of dilute bismuth nitrate solution containing 17.3 percent by weight of Bi, 50 ml of concentrated $HNO_3$ (65% by weight) and 2,150 ml of $H_2O$ are introduced into a 6 liter stirred vessel. A solution of 14.6 g of $NH_4VO_3$ and 30.2 g of $Na_2MoO_4.2H_2O$ in 2,450 ml of $H_2O$ is added dropwise to the above mixture in the course of 60 minutes at 90° C., while stirring. The pH is 0.4 after the addition, and is brought to 3 by adding 105 ml of 50% strength by weight sodium hydroxide solution in the course of 1 hour. Stirring is continued for 1 hour at 90° C., and the pigment is then filtered off under suction, washed nitrate-free, dried, and heated for 1 hour at 600° C.

The lightfastness and thermal stability of the pigment may be improved further by precipitating, for example, a coating of $ZrO_2/SiO_2$ onto the pigment. For this purpose, a dilute solution of $ZrOCl_2.6H_2O$ is added, in the course of 60 minutes, to the aqueous pigment suspension, after precipitation. The $ZrO_2$ content is 3% by weight, based on the total pigment. The pH during the addition is from 3 to 4, and the temperature is 90° C. Thereafter, the pH is increased to 7.5 by adding concentrated sodium hydroxide solution. A dilute water-glass solution (containing 26% by weight of $SiO_2$) is added dropwise to the pigment suspension in the course of a further 60 minutes. The amount of $SiO_2$ added is 3% by weight, based on the total pigment.

Figure 1:
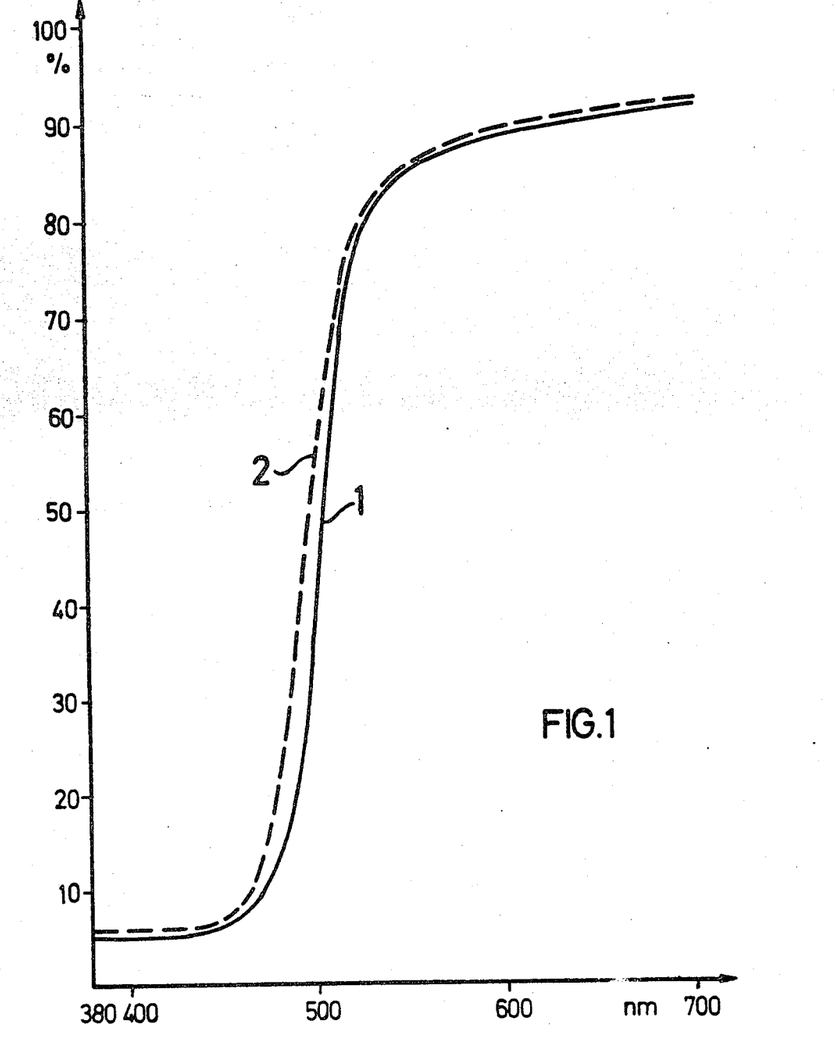
FIG. 1 shows the remission curves obtained using cadmium sulfide and the novel pigment of Example 1 herein.

Samples of the stabilized pigment and of cadmium sulfide were compared with one another. FIG. 1 shows the remission curves of both pigments, curve 1, obtained using cadmium sulfide (Sicotherm ®K 1201), being virtually identical to curve 2, obtained using the novel pigment prepared as described in this example. The ordinate represents the remission in percent, and the abscissa represents the wavelength.

The remission curves as well as all color values are measured on samples dispersed in an alkyd resin. The layers of the samples are 100 μm thick, and 0.5 g of pigment is dispersed in 4.45 g of the finish in each case. The remission curves are recorded with the DMC 25 measuring instrument from Zeiss. The color values of the samples are measured with the D 25 - 9 AA tristimulus colorimeter from Hunterlab. In this example and in the examples below, these values are given in the CIE-LAB system, being the bightness, and the particular color interval and $\Delta E$ the color difference with respect to a comparative sample. The lightfastness of the coated and non-coated samples is determined by irradiating the samples which had been ground with a paint base. The radiation source used is an Osram HBO 200 W-4 bulb, with a 1 mm thick KG 1 filter from Schott. The distance from the light source to the sample is 200 mm, and the sample is irradiated for 65 hours. The color differences ($\Delta E$ values) of the samples are determined in each case before and after irradiation: $1.0BiVO_4.1.0Bi_2MoO_6$, without a coating: $\Delta E = 3.10$ $1.0BiVO_4.1.0Bi_2MoO_6$, coated with 3.2% by weight of $ZrO_2$ and 2.8% by weight of $SiO_2$: $\Delta E = 2.85$.

It can be seen from the $\Delta E$ values that the $ZrO_2/SiO_2$ coated sample possesses improved lightfastness.

EXAMPLE 2

Compositions containing bismuth vanadate and increasing amounts of bismuth molybdate Compositions containing bismuth vanadate and increasing amounts of bismuth molybdate are prepared as described in Example 1. The particular amounts, compositions and process parameters are summarized in Table 1:

TABLE 1

|  | a | b | c | d | e | f |
|---|---|---|---|---|---|---|
| Initial | 289 ml Bi(NO₃)₃ solution | 454 ml | 310 ml | 413 ml | 1020 ml* | 1299 ml* |
| mixture | 50 ml HNO₃ conc. | 50 ml | 50 ml | 50 ml | 50 ml | 50 ml |
|  | 2150 ml H₂O | 2000 ml | 2150 ml | 2050 ml | 1400 ml | 1100 ml |
| Feed (introduced | 29,2 g NH₄VO₃ | 29.2 g | 14.6 g | 14.6 g | 14.6 g | 14.6 g |
| in the course of | 12,1 g Na₂MoO₄.2H₂O | 36.3 g | 30.2 g | 45.4 g | 68.0 g | 90.7 g |
| 60 minutes) | 2450 ml H₂O | 2450 ml | 2450 ml | 2450 ml | 2450 ml + 10 ml | 2450 ml + 10 ml |

TABLE 1-continued

|  | a | b | c | d | e | f |
|---|---|---|---|---|---|---|
|  |  |  |  |  | 50% strength by weight of NaOH | 50% strength by weight of NaOH |
| Temperature | 85° C. | 86° C. | 85° C. | 85° C. | 86° C. | 85° C. |
| pH after addition | 0.6 | 0.5 | 0.4 | 0.9 | 0.6 | 0.4 |
| NaOH (50% by weight) added in the course of 60 minutes | 102 ml | 145 ml | 107 ml | 133 ml | 206 ml | 254 ml |
| pH after addition of 50% strength by weight NaOH | 3 | 3 | 3 | 3 | 3 | 3 |
| Pigment composition | 1.0 $BiVO_4$ 0.2 $Bi_2MoO_6$ | 1.0 $BiVO_4$. 0.6 $Bi_2MoO_6$ | 1.0 $BiVO_4$. 1.0 $Bi_2MoO_6$ | 1.0 $BiVO_4$. 1.5 $Bi_2MoO_6$ | 1.0 $BiVO_4$. 2.25 $Bi_2MoO_6$ | 1.0 $BiVO_4$. 3.0 $Bi_2MoO_6$ |

*$Bi(NO_3)_3$ solution in Example 2a, b, c, d: 17.3% by weight of Bi
e, f: 11.0% by weight of Bi Table 2 gives the color values of the pigments in the individual examples. For comparison, the starting substances, i.e. $BiVO_4$ and $Bi_2MoO_6$, as well as CdS have been included in the table. These values show that the proportion of yellow (b* value) increases as the proportion of $Bi_2MoO_6$ in the pigment increases, and reaches a maximum when the composition is 1.0$BiVO_4$.1.0$Bi_2MoO_6$.

Figure 2:
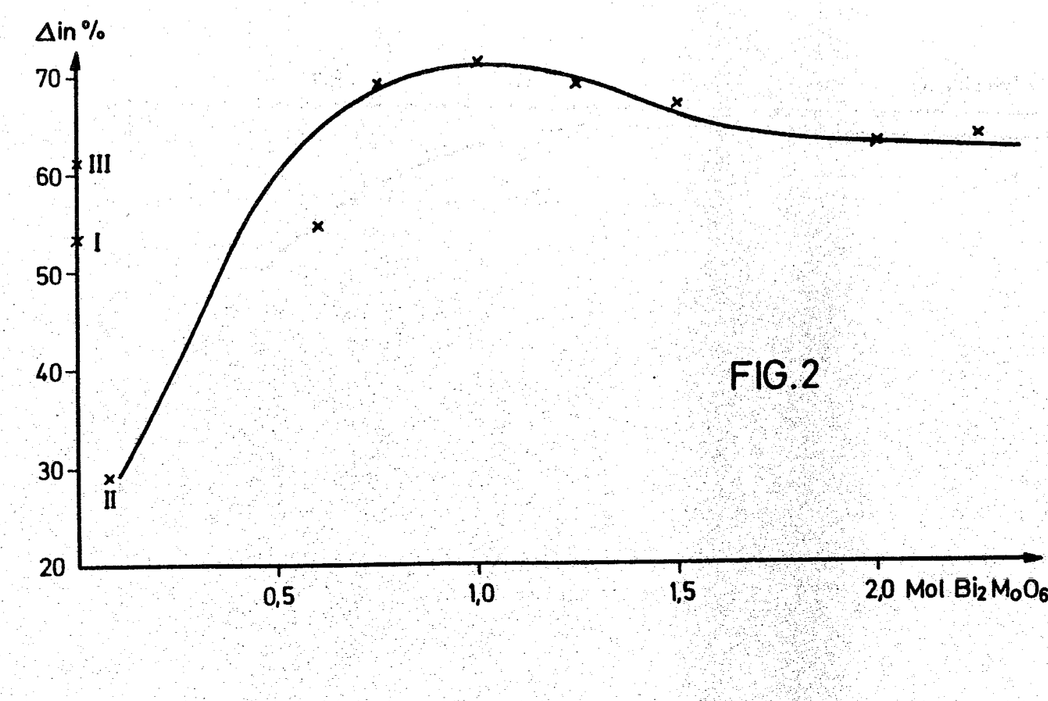
FIG. 2 shows the increase in remission values as the $Bi_2MoO_6$ content increases.

The pigments listed under (a) and (f) in the tables are provided for comparison, and contain a lower (a) or higher (f) proportion of bismuth molybdate than that claimed. The results in Table 2 show that these compositions have color values which are substantially poorer than those of the claimed compositions.

the diagrams), in order to demonstrate the coloring power of the pigments.

To obtain results which may be compared, 5 g of $BiVO_4$ are mixed with 95 g of the extender, ie. $BaSO_4$, in each case, the amount of molybdate in the pigment being allocated to the extender (cf. Table 3). The sample is dispersed in an alkyd resin, the dispersion is applied onto white paper, and the remission curve and color values are then measured (DMC 25 instrument from Zeiss). The increase in remission over the wavelength range 450-525 nm ($\Delta$in %) is obtained from the remission curves, and is plotted against the proportion of $Bi_2MoO_6$ in the pigments (abscissa). From the curve (FIG. 2), it can be seen that, for a constant $BiVO_4$ con-

TABLE 2

| CIELAB color values of compositions containing $BiVO_4$ and increasing proportions of $Bi_2MoO_6$ | | | | | | | | | |
|---|---|---|---|---|---|---|---|---|---|
|  |  |  | (a) | (b) | (c) | (d) | (e) | (f) |  |
| Pigment composition | $BiVO_4$ | 1 mole | 0 | 1 | 1 | 1 | 1 | 1 | CdS (Sicotherm K1201) |
|  | $Bi_2MoO_6$ | 0 | 1 mole | 0.2 | 0.6 | 1 | 1.5 | 2.25 | 3 |  |
| L* |  | 83.50 | 87.10 | 76.07 | 83.54 | 89.17 | 88.8 | 88.36 | 87.97 | 88.08 |
| a* |  | −0.48 | −9.63 | 3.19 | −8.42 | −15.98 | −16.31 | −16.08 | −13.69 | −12.39 |
| b* |  | 41.29 | 42.85 | 71.82 | 97.12 | 100.21 | 93.55 | 84.00 | 66.09 | 107.75 |
| $\Delta$E with respect to CDS |  | 27.58 | 22.87 | 25.20 | 8.20 | 3.75 | 4.47 | 6.11 | 11.31 |  |

EXAMPLE 3

Figure 3:
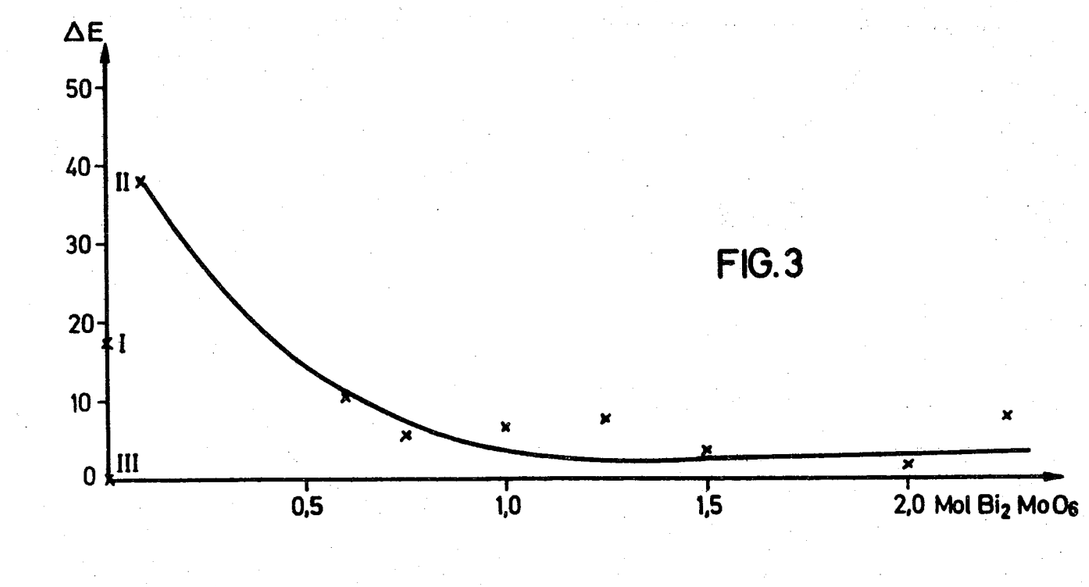
FIG. 3 shows the color differences ΔE of the $BaSO_4$ reduced pigments as the $Bi_2MoO_6$ content increases.

$BiVO_4$-containing pigments reduced with $BaSO_4$ $BiVO_4$-containing pigments of the compositions $BiVO_4$.x$Bi_2MoO_6$ where x is 0.6, 0.75, 1.0, 1.25, 1.5, 2.0 and 2.25 are reduced with $BaSO_4$ and compared with pure $BiVO_4$ (From Example 1 of German Laid-Open Application DOS No. 2,727,863, referred to as I in the diagrams) and with a yellow pigment of the formula $Bi_{1-x/3}Mo_xMo_xV_{1-x}O_4$ where x is 0.213 (from Example 1 of British Pat. No. 2,069,990, referred to as II in the diagrams).

tent, the remission value increases as the $Bi_2MoO_6$ content increases, until it reaches a maximum for the pigment compositions $BiVO_4$.x$Bi_2MoO_6$ where x is from 0.7 to 1.5.

If the color differences $\Delta$E (CIE) of the $BaSO_4$-reduced pigments which were determined with respect to cadmium sulfide (Sicotherm K 1201, referred to as III in the Figures) are plotted against the $Bi_2MoO_6$ content of the pigments, the dependence in FIG. 3 is obtained. Even in this case, when the proportion of $BiVO_4$ in the $BaSO_4$-reduced pigments is kept constant, the pigments of the composition $BiVO_4$.x$Bi_2MoO_6$ where x is from 0.7 to 1.5 are the most similar to the comparative pigment Sicotherm K 1201.

TABLE 3

| Pigment composition | Pigment reduction with $BaSO_4$ | | | | | | |
|---|---|---|---|---|---|---|---|
|  | Reduction (g) $BiVO_4$:$Bi_2MoO_6$:$BaSO_4$ | | | Color values | | | $\Delta$ E(CIE) with respect to CdS | $\Delta$ Remission (%) 450–525 nm |
|  |  |  |  | L* | a* | b* |  |  |
| $BiVO_4$.0.6 $Bi_2MoO_6$ | 5 | 5.65 | 89.3 | 88.96 | −12.49 | 51.77 | 10.83 | 54.6 |
| $BiVO_4$.0.75 $Bi_2MoO_6$ | 5 | 7.1 | 87.9 | 90.67 | −17.35 | 66.31 | 5.8 | 68.8 |
| $BiVO_4$.0.1 $Bi_2MoO_6$ | 5 | 9.4 | 85.6 | 91.26 | −17.31 | 67.77 | 7.31 | 71.3 |
| $BiVO_4$.1.25 $Bi_2MoO_6$ | 5 | 11.7 | 83.3 | 89.76 | −17.29 | 70.18 | 8.86 | 69 |
| $BiVO_4$.1.5 $Bi_2MoO_6$ | 5 | 14.1 | 80.9 | 91.21 | −17.20 | 61.77 | 4.07 | 67 |
| $BiVO_4$.2.0 $Bi_2MoO_6$ | 5 | 18.8 | 76.2 | 88.94 | −15.88 | 60.69 | 2.06 | 63 |

TABLE 3-continued

| | Pigment reduction with BaSO4 | | | | | | |
|---|---|---|---|---|---|---|---|
| | Reduction (g) | | | Color values | | Δ E(CIE) with respect | Δ Remission (%) |
| Pigment composition | BiVO4:Bi2MoO6:BaSO4 | | | L* a* b* | | to CdS | 450–525 nm |
| BiVO4.2.25 Bi2MoO6 | 5 | 21.1 | 73.9 | 91.86 −16.21 54.22 | | 8.84 | 64 |
| BiVO4.0.09 Bi2Mo3O12 (Example 1 from British Patent 2,069,990) | 5 | 1.2 | 93.8 | 91.68 −6.58 24.5 | | 38.75 | 28.5 |
| BiVO4 (Example 1 from German Laid-Open Application DOS 2,727,863) | 5 | | 95 | 91.61 −12.79 44.4 | | 18.23 | 53.2 |
| Sicotherm K 1201 | 5 (CdS) | | 95 | 87.23 −16.32 61.75 | | — | 61.5 |

EXAMPLE 4

Bismuth vanadate/bismuth molybdate with calcium sulfate as the filler

Pigment composition: 1.0 BiVO4.0.75 Bi2MoO6.0.25 CaSO4

464 ml of Bi(NO3)3 solution containing 11% by weight of Bi, 7.38 g of Ca(NO3)2.4H2O, 50 ml of concentrated HNO3 (65% by weight) and 2,100 ml of H2O are introduced into a 6 liter stirred vessel, and heated to 90° C. The following components, dissolved in 2,450 ml of H2O, are added dropwise in the course of 60 minutes, while stirring: 14.6 g of NH4VO3, 22.7 g of Na2MoO6.2-H2O, 4.44 g of Na2SO4 and 10 ml of concentrated NaOH (50% by weight). The pH of the feed is 0.9. The pH of the mixture is brought to 3.0 by adding 104 ml of concetrated NaOH (50% by weight) in the course of 60 minutes. The product is then filtered off under suction, washed nitrate-free and dried. After being heated at 600° C. for 1 hour, the pigment has the following color values:

| L* | 80.05 | a* | −6.70 | b* | 89.66 | ΔE with respect to CdS: 13.78 |
|---|---|---|---|---|---|---|
| CdS | 88.08 | | −12.39 | | 107.75 | |

EXAMPLE 5

BiVO4.0.75 Bi2MoO6: precipitation from an acidic solution containing both components (A) 50 ml of HNO3 (65% by weight) are added to 371 ml of Bi(NO3)3 solution containing 11% by weight of Bi ($\sqrt{}$ =1.28 g/cm$^3$), in a 2 liter stirred flask. 11.7 g of NH4VO3 and a solution of 18.1 g of Na2MoO4.2H2O in 85 ml of H2O and 15 ml of HNO3 (65% by weight) are added, while stirring, and the solution is heated to 90° C., after which it has a pH of >0. The pH is increased to 0.5 by adding 135 ml of sodium hydroxide solution (50% by weight) in the course of 30 minutes.

The mixture is stirred for a further 2 hours at 90° C., and the pigment is filtered off under suction, washed nitrate-free, dried and then heated at 600° C. for one hour.

The resulting pigment has the following composition: 1.0 BiVO4.0.75 Bi2MoO6.

| | | Bi | Mo | V |
|---|---|---|---|---|
| Analysis: | theory (%) | 66.9 | 9.2 | 6.5 |
| | found (%) | 65.4 | 9.6 | 5.5 |

The BET surface area of the precipitated product before heating is 74.4 m$^2$/g.

Color values:

0.5 g of the pigment obtained after heating is dispersed in 4.45 g of alkyl resin and the dispersion is applied onto a white substrate to give a 100 μm thick layer. This layer is used to determine the color values, the measurements being made with a D 25-9AA instrument from HunterLab. In addition, the color difference ΔE with respect to calcium sulfide (Sicotherm K 1201) is determined.

Color values:

L* = 87.8; C*$_{ab}$ = 110.5; H° = 96.4°; a* = −12.3; b* = 109.8;

ΔE with respect to CdS: 0.34.

The corrosion protection was determined by means of the salt spray test (DIN 50,021; ASTM B 117-73).

The following pigments were tested in respect of corrosion protection, and the results were compared: Lead chromate (Sicomin L 1630 S), bismuth vanadate (from Example 1 of German Laid-Open Application DOS No. 2,727,863) and bismuth vanadate/bismuth molybdate from Example 5A.

The pigments, together with the fillers given below, are dispersed for 30 minutes in an alkyd resin binder, using a dispersing apparatus.

Composition of the dispersion: 15.00 g of the above pigment, 9.38 g of kaolin, 9.38 g of iron oxide Fe2O3, 3.75 g of talc, 52.00 g of alkyd resin combination and 5.71 g of xylene.

The dispersed sample is applied onto a sandblasted metal sheet to give a 110 μm thick layer, and the upper part of the sheet is additionally provided with a 100 μm thick covering layer of micaceous iron ore. The corrosion test is carried out in accordance with DIN 50,021 (ASTM B 117-73). After 240 hours and 480 hours, the samples are tested in respect of their degree of rusting (DIN 53,210 or ISO 4628/I-1978), their degree of blistering (DIN 53,209/ASTM D 714-56) and their degree of under-rusting. The results are given in Table 4 below, from which it can be seen that the molybdate-containing bismuth vanadate pigment offers corrosion protection which is comparable to that obtainable with lead chromate but better than that achieved with pure bismuth vanadate.

TABLE 4

Results of the corrosion test

| Pigment | | Degree of rusting | 240 hour salt spray test Degree of blistering (DIN 53,209/ASTM D 714-56) | | Degree of rusting | 480 hour salt spray test Degree of blistering (DIN 53,209/ASTM D 714-56) | | Under rusting |
|---|---|---|---|---|---|---|---|---|
| PbCrO$_4$ | Without covering Layer | Ri 1 | m 2/g 2 | 8 F | Ri 2 | m 5/g 1-2 | 8 D | Ri 2 |
|  | With covering Layer | None found | | | Rr 1 mm Ri 1 | m 2/g 1-2 | 8 F | |
| BiVO$_4$ | Without covering Layer | Ri 1 | m 4/g 2 | 8 MD | Ri 3 | m 5/g 1-4 | 6 D | Ri 3-4 |
|  | With covering Layer | Rr 4 mm Ri 1 | m 2/g 2 | 8 F | Rr 1 mm Ri 1 | m 5/g 1-3 | 8 D | |
| BiVO$_4$ | Without covering Layer | Ri 0-1 | m 5/g 2 | 8 D | Ri 2 | m 5/g 1-2 | 8 D | Ri 2 |
| 0.75 Bi$_2$MoO$_6$ | With covering Layer | None found | | | Rr 1 mm Ri 1 | m 2/g 1-2 | 8 F | |

(B) Comparative example: addition of the vanadate/molybdate solution to the acidic bismuth nitrate solution.

258 ml of bismuth nitrate solution containing nitric acid (17.3% by weight of Bi, $\rho = 1.463$ g/cm$^3$), 50 ml of HNO$_3$ (65% by weight) and 2.2 liters of H$_2$O are introduced into a 6 liter stirred flask, and the solution is heated to 85° C., the pH being 0.7 at this temperature. A solution of 14.6 g of NH$_4$VO$_3$ and 22.7 g of Na$_2$MoO$_4$.2H$_2$O in 2.45 liters of H$_2$O is added dropwise to the above solution, at 85° C., in the course of 60 minutes. After the addition, the pH is brought to 3.0 by adding 103 ml of NaOH (50% by weight) in the course of 60 minutes. The product is then filtered off under suction, washed nitrate-free, and heated for 60 minutes at 600° C. in a muffle furnace. The baking loss is 5.7%.

The pigment has the following composition: BiVO$_4$.0.75 Bi$_2$MoO$_6$.

| | | Bi | Mo | V |
|---|---|---|---|---|
| Analysis: | theory | 66.9% | 9.2% | 6.5% |
|  | found | 66% | 9.6% | 6.5% |

The BET surface area of the precipitated product before heating is 26 m$^2$/g.

Color values of the sample: $L^* = 88.2$, $C^*_{ab} = 93.5$, $H° = 99.0°$, $a^* = -14.6$, $b^* = 92.3$ and $\Delta E$ with respect to Cds $= 3.6$.

The color values show that, compared with the pigment of Example 5B, that of Example 5A has a substantially higher proportion of yellow, and a substantially smaller color difference with respct to Cds (Sicotherm K 1201).

EXAMPLE 6

Pigment composition BiVO$_4$.0.75 Bi$_2$MoO$_6$: precipitation by feeding in the solutions simultaneously.

A solution comprising 371 ml of bismuth nitrate solution containing nitric acid (11% by weight of Bi, $\rho = 1.28$ g/cm$^3$), 50 ml of 65% strength by weight HNO$_3$, 11.7 g of NH$_4$VO$_3$ and 18.15 g of Na$_2$MoO$_4$.2H$_2$O dissolved in 85 ml of H$_2$O and 15 ml of HNO$_3$ (35% by weight) is prepared.

By running the above solution, with a pH of >0, and 173 ml of a 25% strength by weight NaOH solution simultaneously into a 2 liter stirred flask, in the course of 30 minutes, the pigment is precipitated at 80° C. and a pH of 0.5. Stirring is continued for 2 hours at 80° C., during which the pH is kept at 0.5 by the addition of 2 ml of HNO$_3$ (65% by weight). The precipitated product is then filtered off under suction, washed nitrate-free, dried, and heated for 60 minutes at 600° C. in a muffle furnace. The baking loss is 2.5%.

The pigment, after heating, has the following composition: BiVO$_4$.0.75 Bi$_2$MoO$_6$

| | | Bi | Mo | V |
|---|---|---|---|---|
| Analysis: | theory (%) | 66.9 | 9.2 | 6.5 |
|  | found (%) | 65.6 | 9.0 | 6.7 |

The BET surface area of the precipitated product before heating is 68.4 m$^2$/g.

Color values:
$L^* = 87.5$, $C^*_{ab} = 108.8$, $H° = 97.1°$, $a^* = 13.46$, $b^* = 107.98$ and $\Delta E$ with respect to Cds $= 1.2$.

EXAMPLE 7

Pigment composition BiVO$_4$.1.0 Bi$_2$MoO$_6$: precipitation of the pigment from a single solution of the components In a 2 liter stirred vessel, 72.8 g of Bi(NO$_3$)$_3$.5H$_2$O are dissolved in 20 ml of HNO$_3$ (65% by weight) and 40 ml of H$_2$O. 5.85 g of NH$_4$VO$_3$, 140 ml of HNO$_3$ (65% by weight) and 250 ml of water are added to the above solution, a clear yellow solution being obtained. A solution of 12.1 g of Na$_2$MoO$_4$.2H$_2$O in 20 ml of H$_2$O and 6 ml of HNO$_3$ (65% by weight) is added to the solution obtained above, the resulting solution being greenish yellow and having a pH of $-1.1$ at 32° C. 250 ml of 25% strength NaOH and 110 ml of 50% strength NaOH are added in the course of 60 minutes, while stirring, the temperature of the mixture being kept at $\leq 60°$ C. during the addition. After the addition, the pH is 3.0. Thereafter, the suspension is stirred for a further hour at 80° C., and the product is filtered off under suction, washed, dried, and heated for 1 hour at 600° C.

The product, after heating, has the following composition: BiVO$_4$.1.0 Bi$_2$MoO$_6$

| | | Bi | Mo | V |
|---|---|---|---|---|
| Analysis: | theory | 67.14% | 10.27% | 5.45% |
|  | found | 66.5% | 9.9% | 5.5% |

The BET surface area of the precipitated product before heating is 33.5 m$^2$/g.

Color values of the sample after heating:

$L^* = 87.43$, $a^* = -13.59$, $b^* = 100.76$, $C^*_{ab} = 101.7$, $H° = 97.8°$ and $\Delta E$ with respect to $CdS = 2.10$.

Pigment composition $BiVO_4.0.75Bi_2MoO_6.0.1Bi_2WO_6$ 401 ml of an 11% strength by weight $Bi(NO_3)_3$ solution and 50 ml of $HNO_3$ (65% by weight) are introduced into a 2 liter stirred flask, and 11.7 g of $NH_4VO_3$ are added, followed by 18.1 g of $Na_2MoO_4.2H_2O$ dissolved in 85 ml of $H_2O$ and 15 ml of $HNO_3$ (65% by weight). After the mixture has been heated to 80° C., the pH is $>0$. 260 ml of 25% strength by weight NaOH, in which 3.3 g of $Na_2WO_4.2H_2O$ are dissolved, are run in at this temperature in the course of 30 minutes. After the addition, the pH of the suspension is 0.5. Thereafter, the suspension is stirred for a further 2 hours at 80° C., and the product is filtered off under suction, washed nitrate-free, dried, and heated for 1 hour at 600° C.

The sample, after heating, has the composition $BiVO_4.0.75Bi_2MoO_6.0.1Bi_2WO_6$.

| Analysis: | | Bi | Mo | V | W |
|---|---|---|---|---|---|
| | theory | 66.29% | 8.45% | 5.98% | 2.16% |
| | found | 63.9% | 9.2% | 6.3% | 2.3% |

Color values of the sample:
$L^* = 87.6$, $a^* = -13.87$, $b^* = 103.23$, $C^*_{ab} = 104.2$, $H° = 97.7°$ and $\Delta E$ with respect to $CdS = 1.8$.

We claim:
1. A yellow pigment which contains bismuth vandate and has the composition $BiVO_4.xBi_2MoO_6.yBi_2WO_6$ where x is from 0.6 to 2.25 and y is from 0 to 0.1.

* * * * *

UNITED STATES PATENT AND TRADEMARK OFFICE
CERTIFICATE OF CORRECTION

PATENT NO. : 4,455,174

DATED : June 19, 1984

INVENTOR(S) : Henning WIENAND et al.

It is certified that error appears in the above-identified patent and that said Letters Patent is hereby corrected as shown below:

IN THE CLAIMS

Claim 1, line 1, "vandate" should read --vanadate--.

Signed and Sealed this

Sixteenth Day of July 1985

[SEAL]

Attest:

DONALD J. QUIGG

Attesting Officer    Acting Commissioner of Patents and Trademarks